Jan. 22, 1957 G. D. MANVILLE 2,778,118

BUILDERS LAYOUT TAPE

Filed June 22, 1954

INVENTOR:
George E. Manville

By Herbert E. Metcalf
His Patent Attorney

United States Patent Office 2,778,118

Patented Jan. 22, 1957

2,778,118

BUILDERS LAYOUT TAPE

George D. Manville, Malibu, Calif.

Application June 22, 1954, Serial No. 438,460

8 Claims. (Cl. 33—137)

Figures 1, 2, 3, 4, 5, 6, 7:
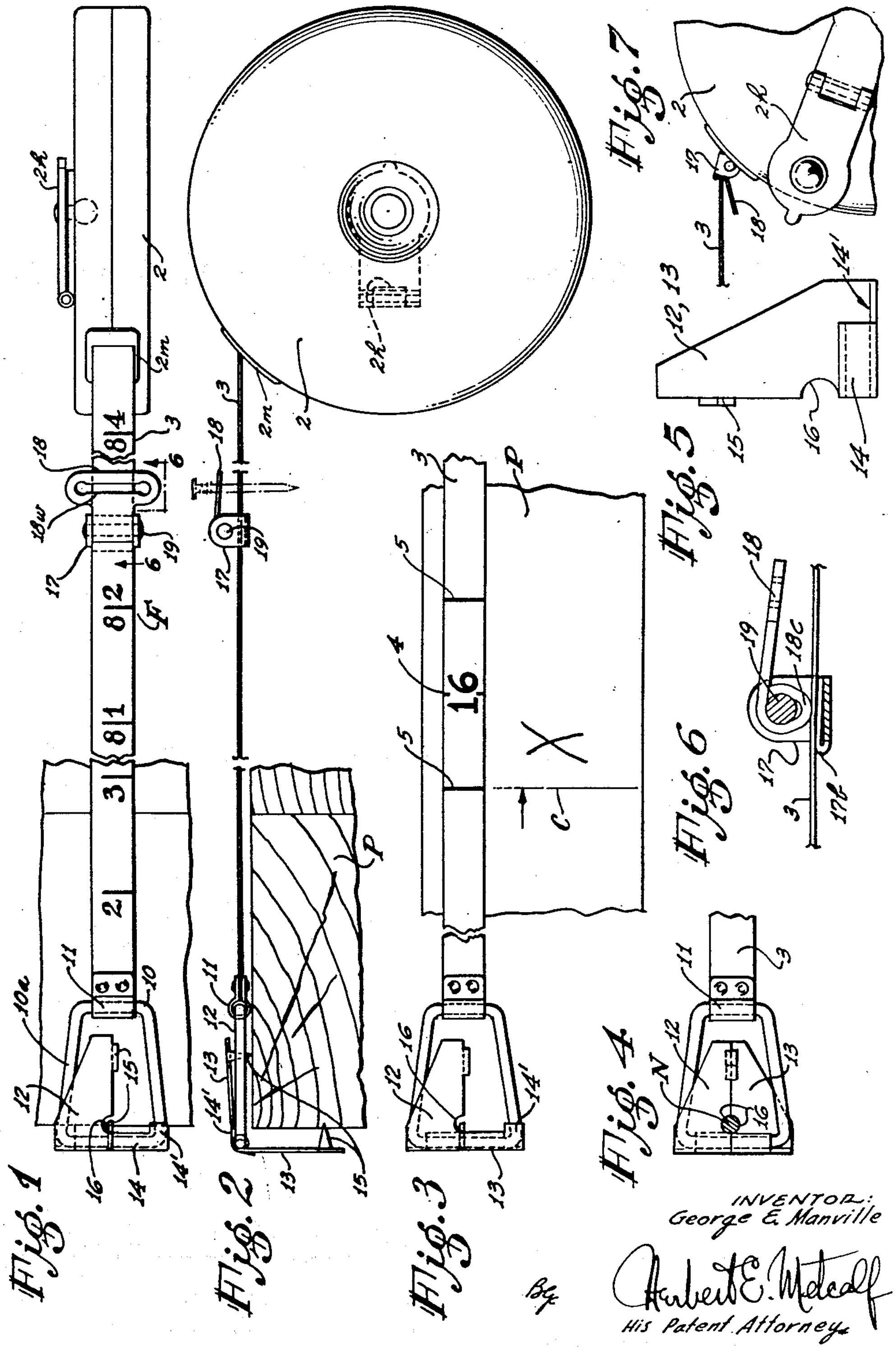

This invention concerns the construction and building art, in particular, and is a novel layout tape and reel unit for architects, engineers, contractors, builders and others.

It is an object of the invention to provide a double-face tape having on one side the usual foot-unit of measure and on the other face a special, 16″ stud center layout index.

A further object of the invention is to provide a simple, practical, reliable, substantial and quickly set means in the form of a double-plate hook device whereby to impale the free end of the tape on a convenient basal structure with the obverse, foot-measure upward as for a layout of measure on a rough floor, or with the 16″ stud-pitch index upward, as for marking off on a floor plate for location of studding.

Another object is to provide a quick adjusting clamp device on the tape which can be set tightly on the tape at any desired measure point from the hooked end of the tape and which is adapted to be temporarily nailed in place, on a flooring or plate, to hold the run-off tape without man aid.

A feature of the invention is that the hooking device affords use as a compass-center anchor and the said clamp will receive a pointed tool, pencil or nail, to scribe a mark around the center-forming hook device, for compass work.

The invention resides in certain advancements in this art as set forth in the ensuing disclosure and has, with the above, additional objects and advantages as hereinafter developed, and whose constructions, combinations and sub-combinations, and detail of means and manner of operation will be made manifest in the following description of the herewith illustrative embodiment; it being understood that modifications, variations, adaptations and equivalents may be resorted to within the scope, spirit and principles of the invention as it is claimed in conclusion hereof.

Figure 1 is a plan view of the foot-measure (obverse) face of the partly extended tape, and its case. Figure 2 is an edge elevation of the tape of Fig. 1, as anchored to a rough flooring and nailed under tension. Figure 3 is a plan view of a fragment of the reverse face of the tape to show a 16″, stud-place index digit. Figure 4 is a detail plan view showing the two hook plates collapsed to form a compass center anchor. Figure 5 is an enlarged scale view of one of the hook plates. Figure 6 is a detail of the yielding bed of the clamp slide. Figure 7 is a side view showing how the clamp slide retracts into the mouth of the tape case.

A conventional reel case 2 has a rim mouth **2*m* from which can be drawn a steel tape which is here distinguished as having an obverse face with the usual foot-indicia F, divided into inch and fractions, and also having on the reverse face stud-pitch indicia in the form of numeral "16," space at 16-inch intervals from the 1″, free end of the tape. At the numeral "16" are top and bottom center indicating marks 4. Currently wall studs are made with a thickness of one and five-eighths inches. Accordingly there are provided on each side of the numeral "16" check-off marks 5 equally spaced from the center marks 4. When marking off a rough floor plate P for placing studding the mechanic lays out the tape (anchored at the inch-end) with the stud pitch indicia (16) upward and he then walks in either direction along the tape and stripes off a straight check mark C and makes an X mark below the edge of the tape and near the check mark C. By now standing a stud on the X mark and with one edge close to the check mark C he has the exact location for nailing of the stud. A mechanic walking to the right hand uses the left check-off mark 5 for his check mark C and a mechanic walking from the right hand length of tape uses the right hand side check mark 5**.

To facilitate using the tape with either face upward the free end of the tape is provided with a dual hook means. This includes a bail link having a pivot bar 10 pivoted at 11 in the tape end and having side arms **10*a* connected by a cross bar 10*c*. This link can be folded back over the tape when not in use. The hook structure here includes a pair of duplicate, relatively inverted stiff metal plates 12 and 13**, and the description of one will suffice.

Each plate has at one end a bearing hub 14 to fit and swing on the cross bar **10*c* and one end of the hub is split and bent out to form a top lug 14′** which will engage an arm of the bail link, Fig. 2, when the plate is swung out for hook use.

Each plate has a straight inner edge which is provided with a sharp, inturned barb 15 adapted to be impaled as in Fig. 2 to safely hold the tape end anchored, as to flooring or plate beam P.

Also, each plate (12—13) has very close to the center of its hub 14, Fig. 5, and in the inner edge of the plate a semicircular notch 16 so that when the two plates are folded into place over the bail link these notches make a circular hole for a compass-center nail N, Fig. 4.

After a length of the tape has been anchored and laid out it can be securely, temporarily tacked or nailed down, Fig. 2. This is made possible by provision of a slide 17 having a yieldable, inturned bed **17*b* on which rests the tape as it passes below an eccentric 18*e* of a clamp lever 18 mounted on a pivot 19 in side wings of the slide. A special feature of the invention resides in providing a transverse window 18*w* in the outer end of the lever. The end of the lever extends beyond the side edges of the tape and is provided with circular holes 18*h* which intersect the window. The layout man can read the foot-measure showing at the window, or by inserting either a nail or a marker in either of the holes 18*h*** can sweep the tape on its compass center for making circles of given radius.

When the tape is wound into the case 2 the released clamp slide will tumble partly into the mouth of the case, assisted by the tape end bail hitch.

The word "stud" as used herein is intended to include rafters, joists and other structural timbers or elements.

What is claimed is:

1. A builders layout tape having measuring indicia on the obverse and reverse faces thereof, and means for anchoring the unreeled end of the tape with either face up for use, said means consisting of a pair of hook plates arranged edge to edge, and a tape end pivot device on which said hook plates are pivoted and have an outward, opposite quarter turn, as to a respective face of the tape, and each hook plate having on its inner edge a ninety degree impaling barb, the inner edges of said hook plates having directly opposite, semicircular notches near their hubs which cooperate to form a compass-center nail hole for the tape.

2. A builders layout tape having measuring indicia thereon and a binding spring clip slidable along the tape, and including a slide with a yielding tape bed and a lever pivoted on the slide and having a clamping hub to bind the interposed tape onto said bed at any desired location along the tape, said lever having a window to disclose said measuring indicia.

3. A builders layout tape and a binding clip slidable along the tape, and including a slide with a yielding tape bed and a lever pivoted on the slide and having a clamping hub to bind the interposed tape onto said bed at any desired location along the tape, said lever having a window extending beyond the sides of the tape for reception of a holding nail on either side of the tape, or a pencil for compass use.

4. A builders layout tape having a free end, one side of said tape having measuring indicia thereon, anchoring means on said free end comprising a pair of hook plates arranged edge to edge, a pivot device on said free end on which said hook plates are pivoted in the plane of said tape to provide an outward opposite quarter turn of said hook plates with respect to the plane of the tape, means for limiting the rotation of said plates to said quarter turns, each of said hook plates having on its inner edge a ninety degree barb, whereby said free end can be hooked to an external member with the indicia of said tape facing in either opposite direction.

5. A builders layout tape having a free end, one side of said tape having measuring indicia thereon, anchoring means on said free end comprising a pair of hook plates arranged edge to edge, a pivot device on said free end on which said hook plates are pivoted in the plane of said tape to provide an outward opposite quarter turn of said hook plates with respect to the plane of the tape, means for limiting the rotation of said plates to said quarter turns, each of said hook plates having on its inner edge a ninety degree barb, whereby said free end can be hooked to an external member with the indicia of said tape facing in either opposite direction, the inner edges of said hook plates having directly opposite, semicircular notches therein which when said plates are folded in the plane of said tape cooperate to provide a compass-center member hole for said tape.

6. An end assembly for a builders layout tape comprising a tape end pivot device attached to a free end of said tape and extending at right angles to the edges of said tape and in the plane of said tape, a pair of plates arranged edge to edge on said pivot device to have an outward opposite quarter turn, means for limiting the rotation of said plates to said quarter turns, said plates being foldable to be substantially in the plane of said tape.

7. An end assembly for a builders layout tape comprising a tape end pivot device attached to a free end of said tape and extending at right angles to the edges of said tape and in the plane of said tape, a pair of plates arranged edge to edge on said pivot device to have an outward opposite quarter turn, means for limiting the rotation of said plates to said quarter turns, said plates being foldable to be substantially in the plane of said tape, the inner edges of said plates having directly opposite notches cooperating when said plates are in edge to edge relation to form a compass-center tool receiving hole for said tape.

8. An end assembly for a builders layout tape comprising a tape end pivot device attached to a free end of said tape and extending at right angles to the edges of said tape and in the plane of said tape, a pair of plates arranged edge to edge on said pivot device to have an outward opposite quarter turn, means for limiting the rotation of said plates to said quarter turn, said plates being foldable to be substantially in the plane of said tape, the inner edges of said plates having directly opposite notches cooperating when said plates are in edge to edge relation to form a compass-center tool receiving hole for said tape, a clamp slide slidable along said tape, means for locking said slide to said tape at will, said slide having a marking tool receiving hole therein at one side of said tape.

References Cited in the file of this patent

UNITED STATES PATENTS

| | | |
|---|---|---|
| 695,528 | Beckley | Mar. 18, 1902 |
| 1,148,306 | Fritz | July 27, 1915 |
| 1,567,602 | Keuffel | Dec. 29, 1925 |
| 1,860,635 | Thompson | May 31, 1932 |
| 1,988,095 | Stockman | Jan. 15, 1935 |
| 2,187,087 | Leary | Jan. 16, 1940 |
| 2,563,674 | Coots | Aug. 7, 1951 |
| 2,582,405 | Auchard | Jan. 15, 1952 |
| 2,627,117 | Kragness | Feb. 3, 1953 |

FOREIGN PATENTS

| | | |
|---|---|---|
| 229,107 | Great Britain | Feb. 19, 1925 |